United States Patent
Klinkhammer et al.

(10) Patent No.: US 9,707,652 B2
(45) Date of Patent: Jul. 18, 2017

(54) MACHINE TOOL FOR PROCESSING PLATE-LIKE WORKPIECES, IN PARTICULAR METAL SHEETS

(71) Applicant: TRUMPF Werkzeugmaschinen GmbH + Co. KG, Ditzingen (DE)

(72) Inventors: Marc Klinkhammer, Ditzingen (DE); Stefan Kerscher, Walzbachtal (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 816 days.

(21) Appl. No.: 13/951,755

(22) Filed: Jul. 26, 2013

(65) Prior Publication Data

US 2014/0038799 A1 Feb. 6, 2014

(30) Foreign Application Priority Data

Aug. 1, 2012 (EP) .................................. 12178805

(51) Int. Cl.
*B23Q 3/155* (2006.01)
*B21D 37/14* (2006.01)
*B21D 37/04* (2006.01)

(52) U.S. Cl.
CPC ......... *B23Q 3/15526* (2013.01); *B21D 37/04* (2013.01); *B21D 37/145* (2013.01);
(Continued)

(58) Field of Classification Search
CPC ......... Y10T 483/1729; Y10T 483/1731; Y10T 483/1845; Y10T 483/1855; B21D 37/145; B23Q 3/15539
(Continued)

(56) References Cited

U.S. PATENT DOCUMENTS 5,093,978 A * 3/1992 Binder ................. B23Q 3/1554
414/751.1
5,224,915 A  7/1993 Kilian
(Continued)

FOREIGN PATENT DOCUMENTS

DE       19500614 A1    7/1995
DE    102010003511 A1   10/2011
(Continued)

*Primary Examiner* — Erica E Cadugan
(74) *Attorney, Agent, or Firm* — Fish & Richardson P.C.

(57) ABSTRACT

A machine tool for processing plate-like workpieces, in particular metal sheets, has a machine frame with a lower frame arm, an upper frame arm and a frame compartment or throat defined between the upper and lower arms. A first tool magazine, close to the station, has storage places for processing tools is arranged at least partially within the frame compartment. The processing tools, such as punch/die sets, can be interchanged at a processing station of the machine tool. By means of a tool transfer device, processing tools can be transferred between the first tool and a second tool magazine, remote from the station. The second tool magazine has a magazine platform that protrudes laterally in a horizontal direction with respect to the machine frame and is accessible from above, on which magazine platform storage places for processing tools interchangeable at the processing station are provided, and above which a tool holder of the tool transfer device is mounted on the relevant longitudinal side of the machine frame.

13 Claims, 6 Drawing Sheets

(52) U.S. Cl.
CPC ....... *B23Q 3/1556* (2013.01); *B23Q 3/15539* (2016.11); *B23Q 3/15573* (2013.01); *Y10T 483/10* (2015.01); *Y10T 483/1731* (2015.01); *Y10T 483/1855* (2015.01)

(58) Field of Classification Search
USPC .......................................... 483/28–29, 63–64
See application file for complete search history.

(56) References Cited

U.S. PATENT DOCUMENTS

| | | | | |
|---|---|---|---|---|
| 5,823,722 | A * | 10/1998 | Takenaka ............. | B23Q 3/1578 408/239 A |
| 5,882,285 | A | 3/1999 | Seto et al. | |
| 2004/0045424 | A1* | 3/2004 | Ikeda .................... | B21D 28/12 83/684 |
| 2010/0145498 | A1* | 6/2010 | Uchikawa .............. | B23Q 17/22 700/179 |
| 2011/0308362 | A1* | 12/2011 | Buettner ................ | B21D 37/14 83/13 |
| 2012/0100974 | A1* | 4/2012 | Busch .................... | B21D 37/14 483/1 |
| 2014/0121084 | A1* | 5/2014 | Klinkhammer ...... | B21D 37/145 483/1 |
| 2015/0314408 | A1* | 11/2015 | Kerscher ............ | B23Q 3/15513 483/58 |

FOREIGN PATENT DOCUMENTS

| | | |
|---|---|---|
| EP | 0648556 A | 4/1995 |
| EP | 0377865 B1 | 10/1996 |
| EP | 1733840 A1 | 12/2006 |
| EP | 2198991 A1 | 6/2010 |

\* cited by examiner

MACHINE TOOL FOR PROCESSING PLATE-LIKE WORKPIECES, IN PARTICULAR METAL SHEETS

CROSS REFERENCE TO RELATED APPLICATION

This application claims priority under 35 U.S.C. §119(a) to European Application No. 12 178 805.3, filed on Aug. 1, 2012, the entire contents of which are hereby incorporated by reference.

TECHNICAL FIELD

The invention relates to a machine tool for processing plate-like workpieces, in particular metal sheets.

BACKGROUND

A representative machine tool for processing plate-like workpieces, in particular metal sheets, is known from EP 0 648 556 A1. This document discloses a turret punch press for sheet metal processing with an O-shaped machine frame. A coordinate guide for the metal sheets to be processed and a tool turret are housed in the inner compartment of the frame. The tool turret is rotatable about a vertical axis and is provided along the circumference thereof with a plurality of storage places for punching tools. A feed motion of the tool turret about the axis of rotation causes the particular punching tool that is required for the workpiece processing to be carried out to be positioned at a processing station of the turret punch press. A tool transfer device loads the storage places of the tool turret with the punching tools required for the forthcoming workpiece processing. Punching tools no longer required are removed by the tool transfer device from the storage places of the tool turret, punching tools that are required are transferred by the tool transfer device to the storage places of the tool turret. In so doing, in addition to approaching the tool turret the tool transfer device approaches a tool magazine spaced from the tool turret; the tool transfer device removes from said tool magazine the punching tools to be supplied to the tool turret and the tool transfer device inserts into said tool magazine the punch tools removed from the tool turret. The storage places of the tool magazine provided for the punching tools are housed in a frame compartment open towards one longitudinal side of the machine frame. The tool transfer device moves in the longitudinal direction of the machine frame between a position in which it is arranged in front of the lateral opening of the frame compartment and a position in which is it located adjacent a punching tool storage place provided on the tool turret. For receiving or transferring a punching tool, the tool transfer device engages in the horizontal direction in the relevant storage place on the tool turret or in the relevant storage place on the tool magazine. During movement along the machine frame the tool transfer device is guided on guide rails running horizontally and offset with respect to each other perpendicularly to a longitudinal lateral wall of the machine frame.

Other improvements in machine tools for processing plate-like workpieces, in particular metal sheets, are sought.

SUMMARY

One aspect of the invention features a machine tool for processing plate-like workpieces, in particular metal sheets. The machine tool includes a machine frame having lower and upper frame arms extending in a longitudinal direction of the machine frame and spaced apart in a vertical direction to define a frame compartment. A processing station is supported by the machine frame and configured to interchangeably receive a processing tool for workpiece processing. The machine tool has a first tool magazine disposed at least partially within the frame compartment and defining storage places configured to store processing tools interchangeable at the processing station. The first tool magazine and the processing station are movable relative to each other so as replace a processing tool at the processing station with a processing tool from the first tool magazine. A second tool magazine defines storage places configured to store processing tools remote from the processing station, and is disposed farther than the first tool magazine from the processing station. A tool transfer device has a tool holder configured to hold processing tools during tool transfer between the first and second tool magazines, the tool transfer involving relative motion between the tool holder and at least one of the first and second tool magazines in the longitudinal direction of the machine frame.

According to this aspect of the invention the remote or second tool magazine includes a magazine platform that protrudes laterally in a horizontal direction with respect to the machine frame and is accessible from above with storage places for processing tools to be interchanged at the processing station. The tool transfer device is mounted above the magazine platform on the relevant longitudinal side of the machine frame. The magazine platform is accordingly provided on the outside of the machine frame and is readily accessible there for the tool transfer device tool holder arranged above the magazine platform. The arrangement of the magazine platform and the tool transfer device on the outside of the machine frame in particular provides an opportunity for existing machine tools that do not have a remote tool magazine to be retrofitted with such a tool magazine at no great expense.

The remote tool magazine, including the magazine platform, can in principle be designed as a unit separate from the machine frame of the machine tool, but a magazine platform connected to the machine frame is preferred. By virtue of said connection the magazine platform is arranged in a permanently defined manner with respect to the remaining functional units of the machine tool, more especially also with respect to the tool transfer device. This circumstance facilitates in particular a positionally accurate relative movement of the magazine platform and the tool transfer device.

There are different options for configuring the tool magazine that is close to the station. In a preferred construction, the tool magazine close to the station comprises a horizontal carrier arranged at least partially in the frame inner compartment of the machine frame and extending transversely to the longitudinal direction of the machine frame. Storage places for processing tools are provided adjacent each other in the longitudinal direction of the carrier. The storage places of such a linear magazine are easily accessible for the tool transfer device. So that all storage places arranged along the horizontal carrier can be reached by the tool transfer device, the horizontal carrier and the tool transfer device are movable relative to each other in the longitudinal direction of the horizontal carrier. For that purpose the horizontal carrier of the linear magazine is preferably movably guided in the longitudinal direction thereof on the machine frame.

In order to transfer processing tools between the remote tool magazine and the tool magazine close to the station, a tool transfer movement is carried out in the longitudinal direction of the machine frame. This tool transfer movement is a relative movement between the tool holder of the tool transfer device on the one hand, and the remote tool magazine and/or the tool magazine close to the station on the other hand.

In order to carry out the tool transfer movement, the tool holder of the tool transfer device may be moved on the machine frame in the longitudinal direction of the frame into a receiving/transfer position remote from the station at the tool magazine remote from the station, and into a receiving/transfer position close to the station at the tool magazine close to the station. Advantageously, the tool holder of the tool transfer device constitutes only a small mass to be moved. This circumstance is accompanied in particular by high positional accuracy when approaching the receiving/transfer positions at the remote tool magazine and at the tool magazine close to the station. In addition, the tool transfer movement can be achieved by means of comparatively low-power and hence inexpensive drives.

In addition or as an alternative, in a further embodiment the tool magazine close to the station and/or the magazine platform of the remote tool magazine are/is movable with a tool transfer movement along the machine frame. In particular the tool holder of the tool transfer device can be fixedly connected to the machine frame. The tool magazine close to the station and/or the magazine platform of the remote tool magazine takes on at least part of the tool transfer movement. This option for producing the tool transfer movement is appropriate in particular in cases in which the tool magazine close to the station is movable in any case in the longitudinal direction of the machine frame. This is the case, for example, when the tool magazine close to the station is integrated in a coordinate guide for the workpieces to be machined. If the tool magazine close to the station, which tool magazine is already provided with a drive, takes on the complete tool transfer movement between the remote tool magazine and the tool magazine close to the station, then no separate drive is needed for the tool transfer.

In some embodiments the magazine platform of the remote tool magazine actively performs a tool transfer movement that is advantageously generated by means of the movable tool magazine close to the station.

If, for the tool transfer movement, the magazine platform of the remote tool magazine can be detachably coupled to the tool magazine which is close to the station and is in any case driven, then the connection of the magazine platform to the tool magazine close to the station can be limited to those cases in which a tool transfer movement has to be performed. In the case of other movements, the magazine platform does not need to be moved by the tool magazine close to the station.

In a further preferred embodiment, the magazine platform of the remote tool magazine, which magazine platform is disengaged from the tool magazine close to the station, is arranged in a rest position away from the receiving/transfer position. In this manner it is ensured that the remote tool magazine not currently in use does not impede the other procedures of the machine tool.

In the interests of an efficient tool management, in some embodiments the tool holder of the tool transfer device comprises a plurality of tool holding elements that are offset with respect to each other in the direction of the tool transfer movement. By virtue of this feature it is possible in particular to carry out a tool removal operation and a tool transfer operation in immediate succession. If the receiving position of the one tool holding element coincides with the transfer position of the other tool holding element, then only a comparatively short transfer path has to be covered between the take up of the one tool and the transfer of the other tool. In addition, the mutual offset of the tool holding elements in the direction of the tool transfer movement and hence in the longitudinal direction of the machine frame keeps the projection of the tool holder in the transverse direction of the machine frame to a minimum.

In some embodiments, the tool holder is adjustable in a horizontal direction perpendicular to the longitudinal direction of the machine frame with respect to the magazine platform of the second tool magazine, and advantageously has a large range. The magazine platform of the remote tool magazine can be designed correspondingly for receiving processing tools.

In a further preferred embodiment the magazine platform of the remote tool magazine is supported interchangeably on a supporting structure of the remote tool magazine. As a result of this feature, the configuration of the remote tool magazine can be adapted in a simple manner to changing requirements. For example, after completion of a processing task a magazine platform fitted with the relevant set of processing tools can be replaced by a magazine platform on which the processing tools required for the succeeding processing are arranged. The magazine platforms can be set up away from the machine tool. Exchange of the magazine platforms can be effected manually, for example.

Another aspect of the invention features a method of changing processing tools in a machine for processing plate-like workpieces, in particular metal sheets, such as in an automated punching machine. The method includes, in reference to a machine of the type described herein: activating a tool transfer device positioned above a selected processing tool stored in a processing tool storage place of the second tool magazine, such that the tool transfer device holds a processing tool stored in the second tool magazine; initiating a relative motion between the tool transfer device and the first tool magazine in the longitudinal direction of the machine frame, thereby moving the held processing tool to the first tool magazine; releasing the held processing tool and storing the released processing tool in a storage place of the first tool magazine; reducing a distance between the first tool magazine and the processing station; and replacing a processing tool held in the processing station with the stored processing tool.

DESCRIPTION OF DRAWINGS

Like reference numbers in the figures indicate like elements.

DETAILED DESCRIPTION

Figure 1:
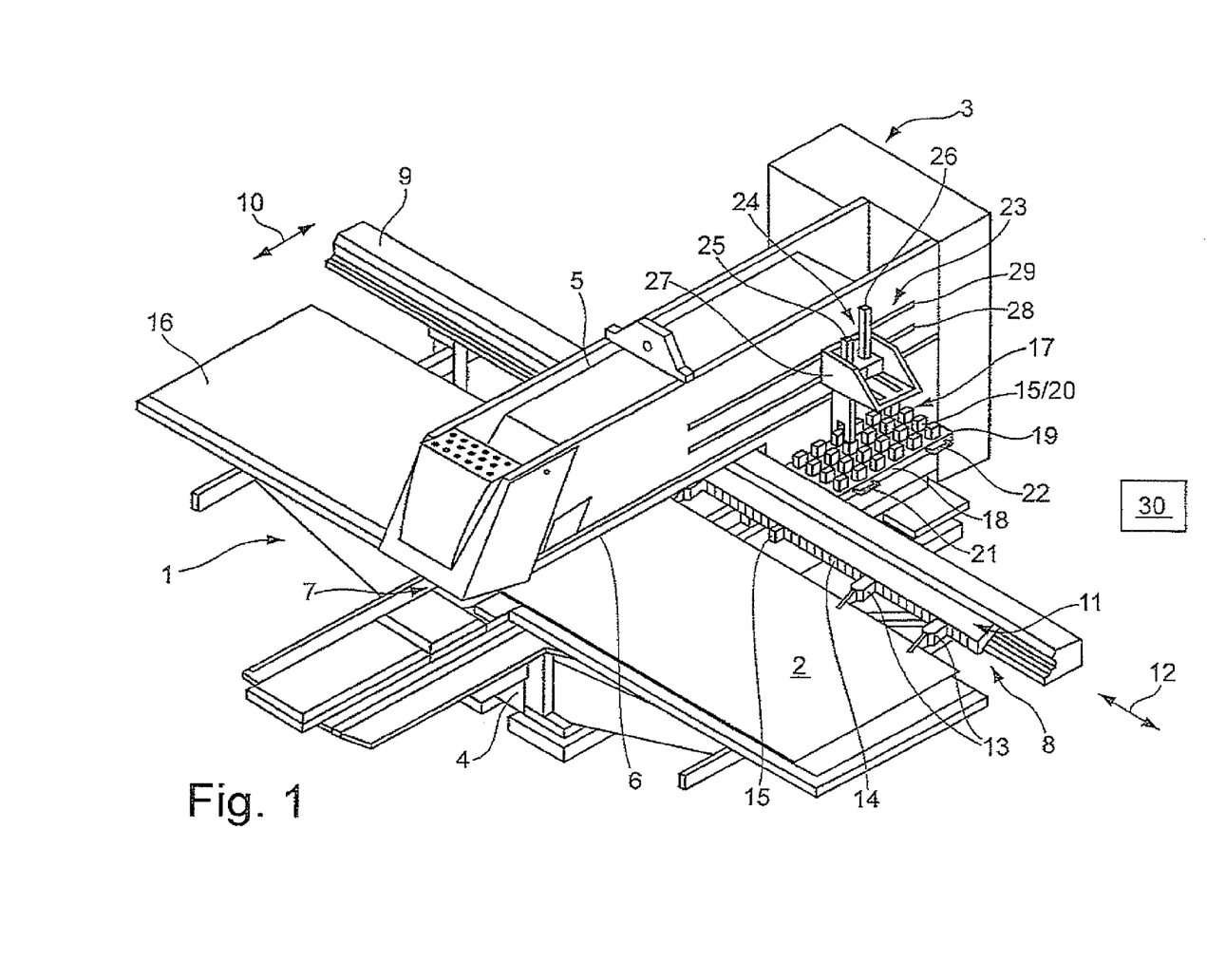
FIGS. 1 through 9 sequentially illustrate the replacement of a processing tool in a punching machine for sheet metal processing, with a tool transfer device and a first construction of a remote tool magazine.

Referring first to FIG. 1, a machine tool designed as a punching machine 1 for processing metal sheets 2 has a C-shaped machine frame 3 with a lower frame arm 4 and an upper frame arm 5. The lower frame arm 4 and the upper frame arm 5 extend in the longitudinal direction of the machine frame 3 and are spaced apart from each other in the vertical direction to form a frame inner compartment or throat 6. At the free end of the lower frame arm 4 and the upper frame arm 5 there is a punching station 7, hidden in the figures, of conventional construction as the processing station of the punching machine 1. The punching station 7 comprises in the usual manner a lower tool seat on the lower frame arm 4 and an upper tool seat on the upper frame arm 5.

A likewise customary coordinate guide 8 is partially accommodated in the throat 6 of the machine frame 3. The coordinate guide 8 comprises a cross beam 9, which is movably guided on the lower frame arm 4 in the longitudinal direction of the machine frame 3 and can be moved by motor in the direction of double arrow 10. The cross beam 9 in turn guides a horizontally running cross rail 11, which is arranged partially inside the throat 6 and which is moved by means of a motor drive in the direction of a double arrow 12 transversely to the machine frame 3. The cross rail 11 is provided with clamping claws 13 and also has storage places 14 for processing tools in the form of punching tools 15. The punching tools 15 are of conventional construction and accordingly include a punch as the upper tool, a die as the lower tool, and a stripper. The individual parts of each of the punching tools 15 are housed, as is customary, in a tool cassette. The relevant tool cassette is manipulated to manage the punching tools 15. The punching tools 15, including the respective associated tool cassettes, are illustrated merely schematically in the figures.

By means of the clamping claws 13 a metal sheet 2 to be processed is fixed in the customary manner to the coordinate guide 8. Owing to the fact that the cross beam 9 is movable in the direction of double arrow 10 and the cross rail 11 is movable in the direction of double arrow 12, the metal sheet 2 can be moved by the coordinate guide 8 in a horizontal processing plane defined by double arrows 10 and 12. Corresponding movements of the metal sheet 2 are performed in order to position the metal sheet 2 with respect to the punching station 7 of the punching machine 1 for the processing operation and in order to move the metal sheet 2 relative to the punching station 7 during the punching operation. In both cases the metal sheet 2 is supported on a stationary workpiece table 16 of the punching machine 1.

With the storage places 14 for punching tools 15, the cross rail 11 of the coordinate guide 8 forms a tool carrier or a tool magazine that is arranged close to the processing station 7. Usually, the cross rail 11 is fitted with a punching tool set comprising a plurality of punching tools 15 for the particular sheet metal processing to be carried out. For the sake of clarity, only a maximum of two punching tools 15 are shown on the cross rail 11 in the figures.

The punching tools 15 are interchanged at the upper tool seat and at the lower tool seat of the punching station 7 in the customary manner by means of the coordinate guide 8. The mobility of the cross beam 9 of the coordinate guide 8 in the direction of double arrow 10 and the mobility of the cross rail 11 in the direction of double arrow 12 is also used for that purpose. For tool changeover, the coordinate guide 8 first approaches the punching station 7 with an empty storage space 14 on the cross rail 11. The punching tool 15 inserted at the punching station 7 is subsequently transferred out of the upper tool seat and out of the lower tool seat of the punching station 7 to the previously empty storage place 14 of the cross rail 11. The punching tool 15 required for the next processing step and which is held ready on the cross rail 11 is subsequently inserted into the upper tool seat and into the lower tool seat of the punching station 7 by corresponding movement of the coordinate guide 8.

During tool changeover at the punching station 7 the metal sheet 2 to be processed is released from the coordinate guide 8 and rests on the workpiece table 16. Once the tool changeover at the punching station 7 is completed, the metal sheet 2 to be processed is gripped by the coordinate guide using the clamping claws 13 and then to carry out the impending processing is moved relative to the punching tool 15 inserted at the punching station 7.

The punching tools 15 stored at the storage places 14 of the cross rail 11 come from a tool magazine 17 remote from the station, which tool magazine is provided close to the throat 6 at the rear end of the machine frame 3. The remote tool magazine 17 has a magazine platform 18, which is pushed interchangeably into a supporting structure 19 of the remote tool magazine 17, the supporting structure being secured to the machine frame 3. The magazine platform 18 is thus detachably connected to the machine frame 3. The magazine platform 18 has on the top face thereof storage places 20 for punching tools 15. In the example illustrated, four storage place rows running parallel to one another in the longitudinal direction of the machine frame 3, each row having six storage places 20, are provided on the magazine platform 18. The magazine platform 18 can accordingly store a total of twenty-four punching tools 15. If the machine frame 3 has a suitable length, a storage place row can have, for example, seven storage spaces 20. Handles 21, 22 on the magazine platform 18 are used for handling the magazine platform 18 during exchange thereof.

In order to transfer punching tools 15 between the remote tool magazine 17 and the tool magazine close to the station (i.e., the cross rail 11 of the coordinate guide 8), a tool transfer device 23 is used. Operation of the tool transfer device 23 is illustrated in FIGS. 1 to 9. The tool transfer device comprises a tool holder 24 with two tool holding fixtures in the form of tool grippers 25, 26. The tool grippers 25, 26 are of conventional construction. They can be opened and closed by motor and are numerically controlled.

The tool holder 24 with both tool grippers 25, 26 is movably guided on a transfer carriage 27 of the tool transfer device 23 in the transverse direction of the machine frame 3. In addition, the tool grippers 25, 26 and the tool holder 24 can be raised and lowered vertically with respect to the transfer carriage 27. In its turn the transfer carriage 27 is movable along the upper frame arm 5 of the machine frame 3 on guide rails 28, 29 fixed to the machine frame. All movements of the tool holder 24 and of the transfer carriage 27 of the tool transfer device 23 are generated by means of drive motors, not shown in detail. A programmable numeric control 30 indicated in outline in FIG. 1 controls the drive motors of the tool transfer device 23 and also all other essential functions of the punching machine 1.

If an empty storage place 14 on the cross rail 11 is to be fitted with a specific punching tool 15 stored in the tool magazine 17 remote from the station, then the coordinate guide 8 first moves into its rear end position on the machine frame 3. Subsequently or simultaneously the tool holder 24 is moved with one of the tool grippers 25, 26, in the example illustrated with tool gripper 25, along the upper frame arm 5 of the machine frame 3 into a receiving position above the punching tool 15 that is to be interchanged on the cross rail 11; at this point the punching tool 15 is still stored on the magazine platform 18 of the remote tool magazine 17. For this purpose the transfer carriage 27 of the tool transfer device 23 moves along the guide rails 28, 29.

Figure 2:
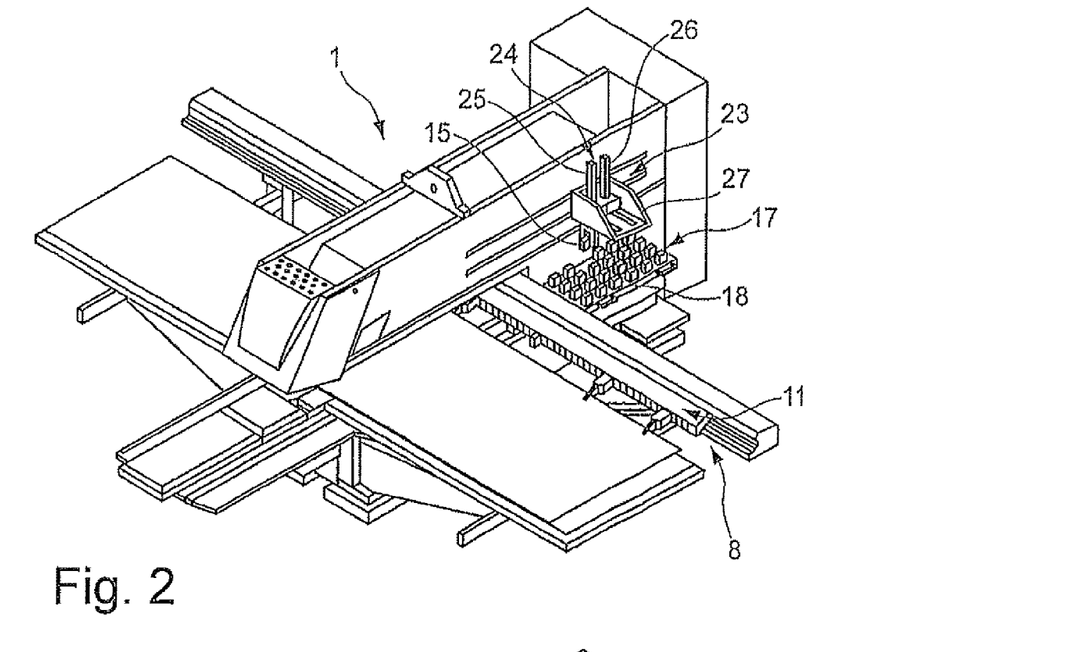

From the position above the punching tool 15 to be transferred, the opened tool gripper 25 is lowered towards the magazine platform 18 of the remote tool magazine 17 until it is located at the punching tool 15 to be picked up. By appropriate operation of the tool gripper 25 the punching tool 15 is fixed to the tool gripper 25. The situation is then as shown in FIG. 1. With the tool holder 24 still located in the receiving position at the remote tool magazine 17, the tool gripper 25 with the punching tool 15 fixed thereto is raised and the punching tool 15 is consequently removed from its storage place 20 on the magazine platform 18 of the remote tool magazine 17 (FIG. 2).

Figure 3:
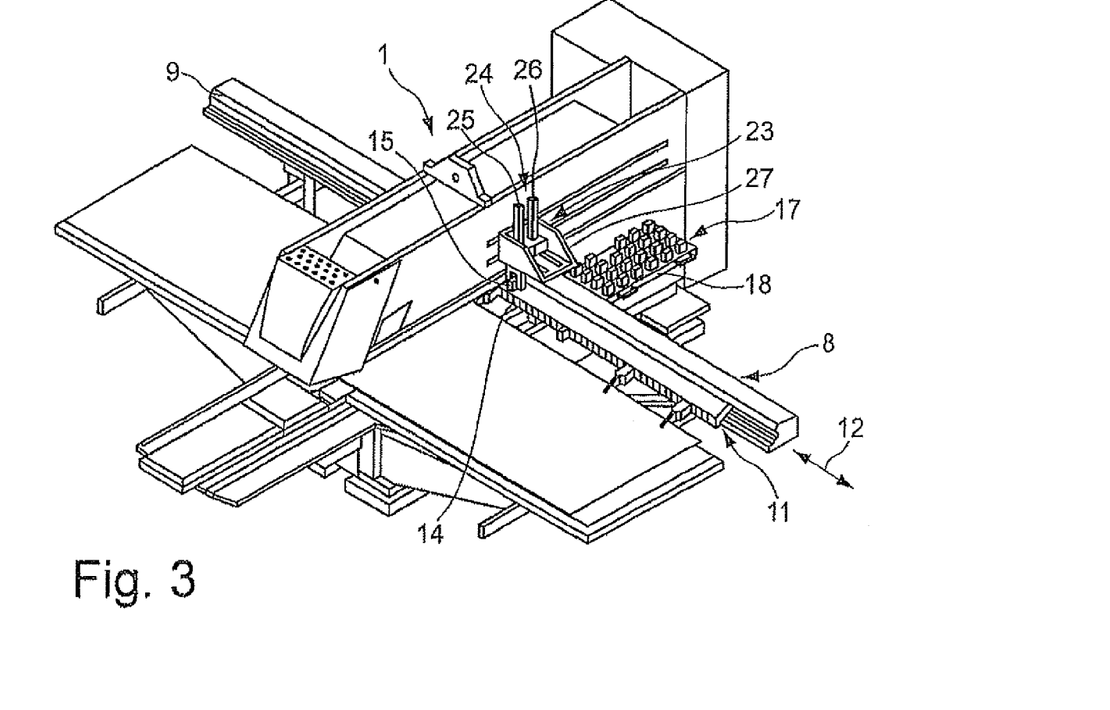

The tool holder 24 is subsequently moved, jointly with the punching tool 15 held thereon, by the transfer carriage 27 with a tool transfer movement along the machine frame 3 in the direction towards the cross rail 11 until the tool holder 24 has reached its transfer position, close to the station, at the cross rail 11 (FIG. 3). Once the tool holder 24 assumes its transfer position close to the station, then the punching tool 15 on the tool gripper 25 is positioned above the particular storage place 14 of the cross rail 11 to which it is to be transferred. The cross rail 11 is correspondingly positioned relative to the cross beam 9 of the coordinate guide 8 in the direction of double arrow 12.

Figure 4:
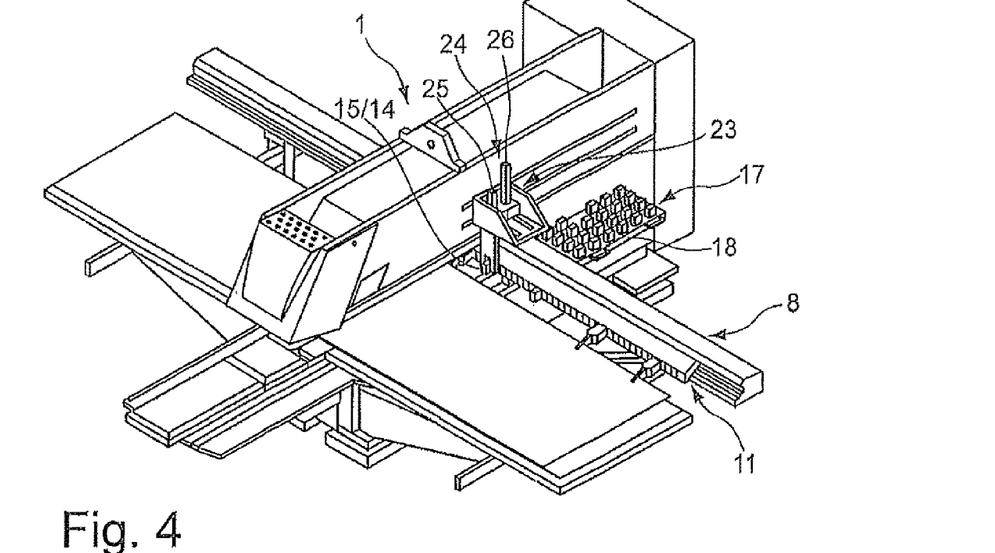
Figure 5:
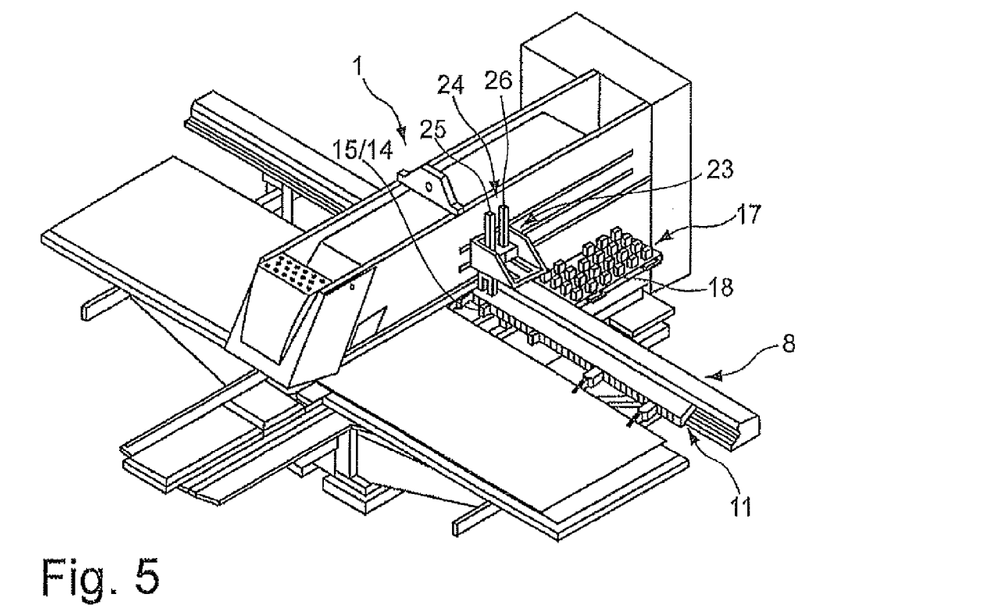

For transfer of the punching tool 15 to the cross rail 11, the tool gripper 25 of the tool holder 24 is lowered vertically and the punching tool 15 is thereby inserted into the relevant storage place 14 on the cross rail 11 (FIG. 4). The punching tool 15 is subsequently released from the tool holder 24 by opening the tool gripper 25. After transfer of the punching tool 15 to the cross rail 11, the tool gripper 25 of the tool holder 23 is raised (FIG. 5).

If a further punching tool 15 is to be transferred from the remote tool magazine 17 to the cross rail 11, then the transfer carriage 27 of the tool transfer device 23 moves with the tool holder 24 in the direction towards the rear end of the machine frame 3 until the tool holder 24 is located with the tool gripper 25 or with the tool gripper 26 in the receiving position remote from the station above the relevant punching tool 15 on the magazine platform 18 of the remote tool magazine 17. Depending on the position of the storage place 20 of the punching tool 15 in question, it may be necessary to move the tool gripper 25, 26 that is used for the tool transfer perpendicularly to the machine frame 3, in order to be able to access a punching tool 15 of the middle row of storage places 20 or one of the rows of storage places furthest from the machine frame on the magazine platform 18 of the remote tool magazine 17.

In the manner described above, the punching tool 15 to be transferred is picked up from the magazine platform 18 of the remote tool magazine 17 and inserted at the cross rail 11.

During the movement along the machine frame 3, the tool holder 24 with the two tool grippers 25, 26 is always located on the transfer carriage 27 in the end position close to the frame perpendicular to the machine frame 3. Mass-related forces that would arise if the tool holder 24 was spaced further away from the machine frame 3 during its movement along the machine frame 3 are in this manner avoided.

The sequence of a tool transfer from the cross rail 11 of the punching machine 1 to the remote tool magazine 17 is illustrated in FIGS. 6 to 9. By means of a corresponding movement of the cross rail 11 along the cross beam 9 of the coordinate guide 8, the punching tool 15 to be transferred was previously arranged beneath the tool holder 24 moved into its receiving position close to the station.

Figure 6:
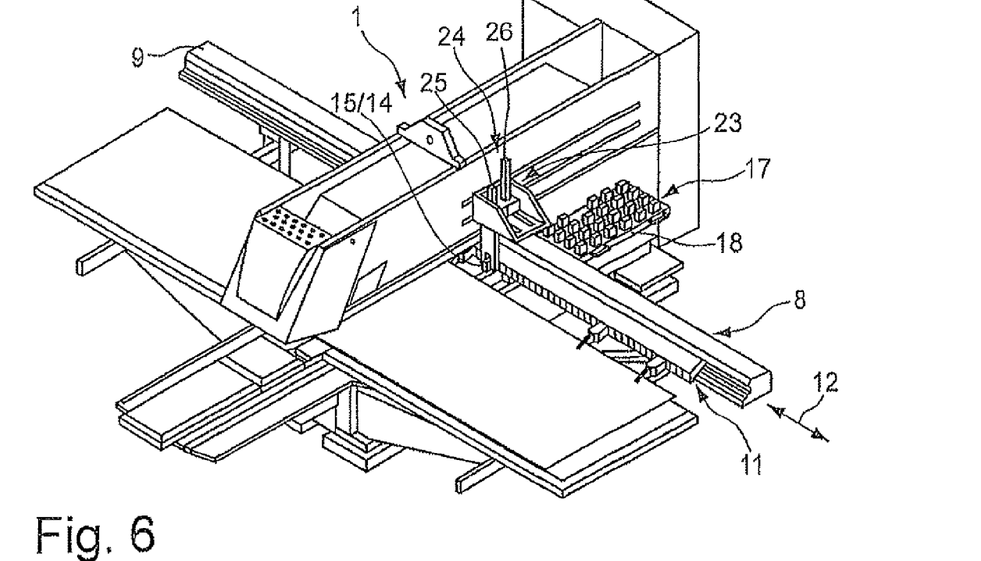

The tool holder 24 is located in the receiving position close to the station in FIG. 6. The tool gripper 25 is lowered vertically and has gripped the punching tool 15 detachably located at a storage place 14 of the cross rail 11.

Figure 7:
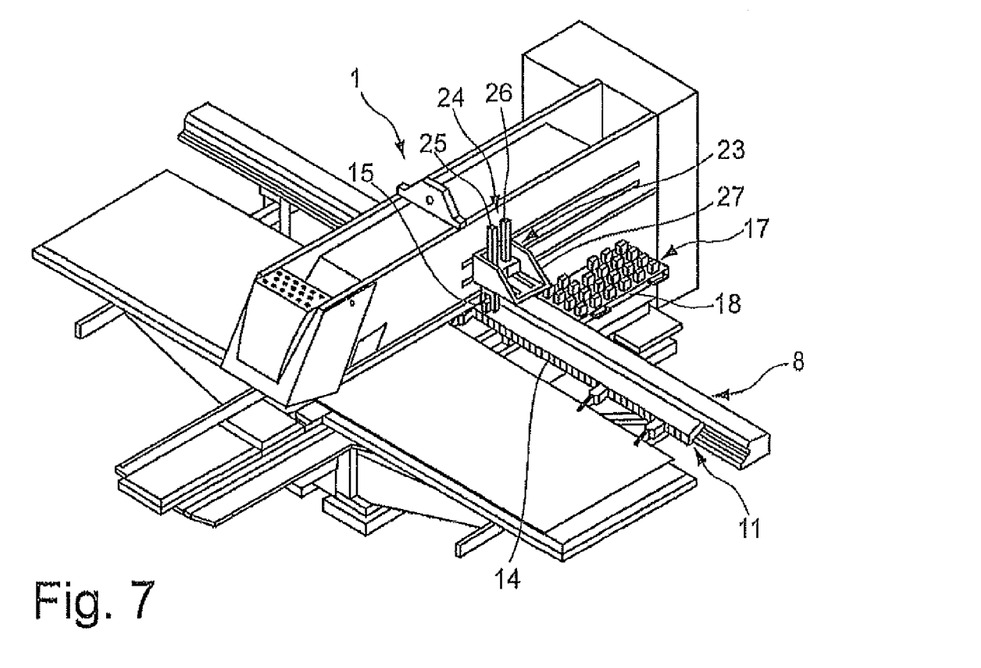
Figure 8:
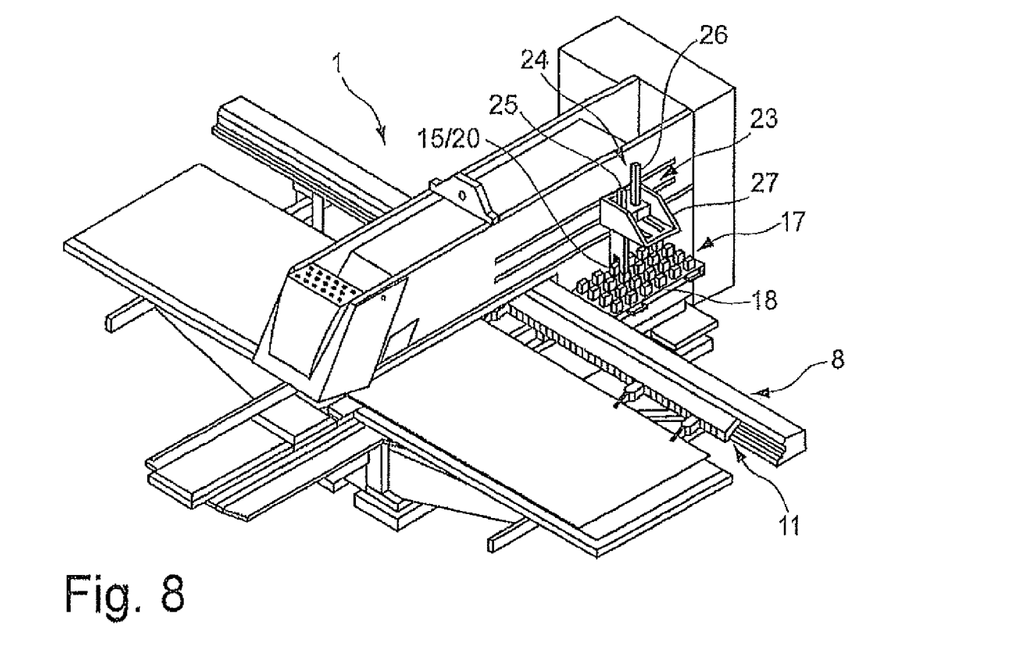
Figure 9:
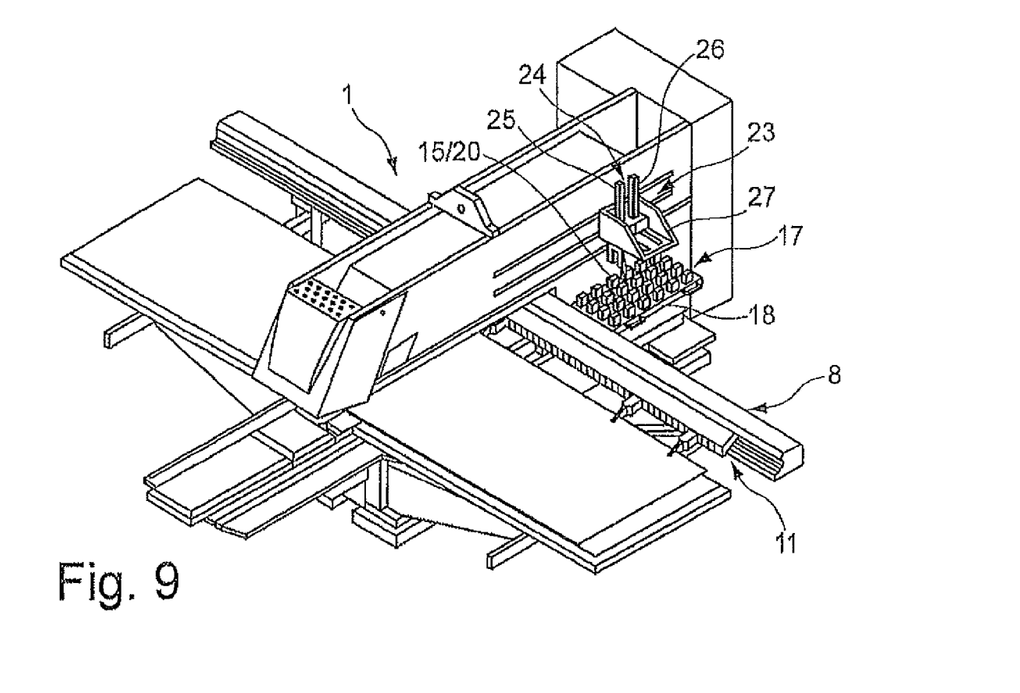

Proceeding from the situation as shown in FIG. 6, the tool gripper 25 with the punching tool 15 affixed thereto is raised (FIG. 7). The transfer carriage 27 with the tool holder 24 and the punching tool 15 is subsequently moved in the direction towards the rear end of the machine frame 3 until the tool holder 24 has reached its transfer position remote from the station and the punching tool 15 held at the tool gripper 25 is located above the storage place 20 provided for the punching tool 15 on the magazine platform 18 of the remote tool magazine 17. The tool gripper 25, together with the punching tool 15, is now lowered and the punching tool 15 is thereby transferred to its assigned storage place 20 (FIG. 8). The tool gripper 25 now releases the punching tool 15 and is subsequently raised into its vertical starting position (FIG. 9). The tool transfer device 23 is thus ready for a further tool change.

Figure 10:
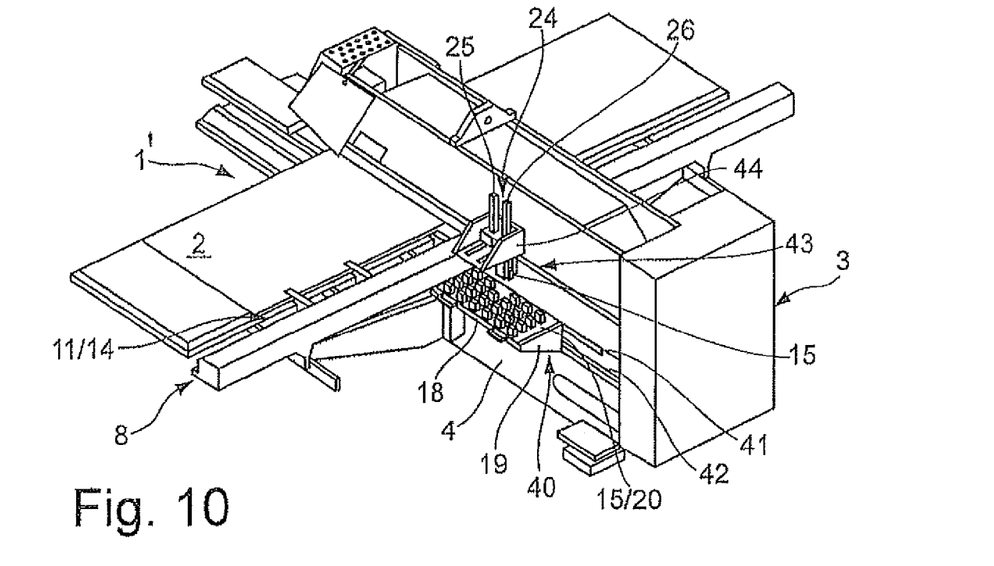
FIGS. 10 and 11 show a tool changeover process in a second embodiment of a punching machine for sheet metal processing.
Figure 11:
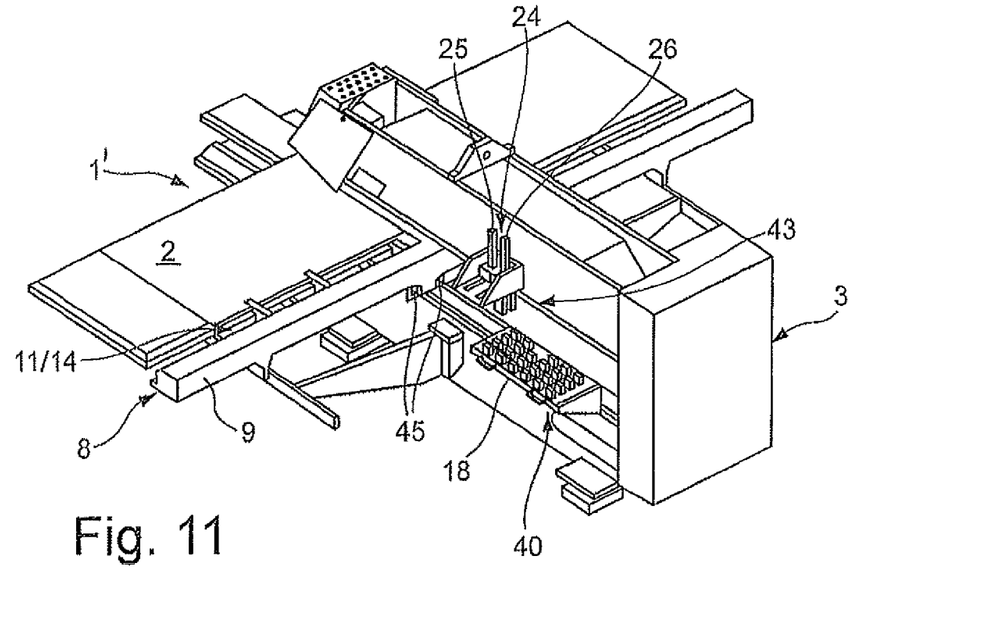

The punching machine 1' shown in FIGS. 10 and 11 differs from the punching machine 1' shown in FIGS. 1 to 9 in the structural design of the remote tool magazine remote and the structural design of the tool transfer device.

The punching machine 1' shown in FIGS. 10 and 11 has a tool magazine 40 which is remote from the station and is movable in the longitudinal direction of the machine frame 3. For that purpose the supporting structure 19 of the remote tool magazine 40 is guided jointly with the magazine platform 18 on guide rails 41, 41 extending in the longitudinal direction of the lower frame arm 4. Four rows, each with six storage places 20 for punching tools 15, are provided on the magazine platform 18. A tool transfer device 43 comprises a tool holder 24 that is stationary in the longitudinal direction of the machine frame 3. The tool holder 24 immovable in the longitudinal direction of the machine frame 3 is movably guided in the transverse direction of the machine frame 3 on a supporting frame 44 firmly connected to the machine frame 3. The tool grippers 25, 26 can be raised and lowered in the vertical direction.

In order to transfer a punching tool 15 from the magazine platform 18 of the remote tool magazine 40 to a storage place 14 on the cross rail 11, the remote tool magazine 40 is positioned with its magazine platform 18 in the longitudinal direction of the machine frame 3 relative to the stationary tool holder 24 of the tool transfer device 43. The positioning movement of the remote tool magazine 40 is generated by the coordinate guide 8. For that purpose the remote tool magazine 40 is connected by means of a switchable coupling 45 (FIG. 11) to the cross beam 9 and via the latter also to the cross rail 11 of the coordinate guide 8. By moving the coordinate guide 8 along the machine frame 3 the magazine platform 18 of the remote tool magazine 40 can be positioned with respect to the tool holder 24 of the tool transfer device 43 in such a manner that the tool holder 24, together with the tool gripper 26 provided for manipulating the punching tool 15 in question, is located in the receiving position above the relevant punching tool 15. After the magazine platform 18 of the remote tool magazine has been positioned, the tool gripper 26 is lowered in the vertical direction and grips the punching tool 15. Together with the punching tool 15 the tool gripper 26 is then raised. This produces the configuration shown in FIG. 10.

Proceeding from this operational state, the coordinate guide 8 moves towards the rear end of the machine frame 3 until the relevant storage place 14 on the cross rail 11 is located beneath the punching tool 15 affixed to the tool gripper 26. In so doing the remote tool magazine 40 connected to the cross beam 9 of the coordinate guide 8 is displaced towards the rear end of the machine frame 3. By lowering the tool gripper 26 of the tool holder 24 into its transfer position, the punching tool 15 is then transferred to the storage place 14 provided for it on the cross rail 11.

Once the cross rail 11 has been fitted with the punching tools 15 required for the subsequent sheet metal processing, the coupling 45 is released and as a result the coordinate guide 8 is separated from the remote tool magazine 40. The coordinate guide 8, without out having to move the tool magazine 40 along with it, can then carry out the movements required for the sheet metal processing to be performed and the tool change at the punching station 7, including movements in the longitudinal direction of the machine frame 3 (FIG. 11). The remote tool magazine 40, now disengaged from the coordinate guide 8, remains in its rest position at the rear end of the machine frame 3. In order to carry out a further tool change over, the remote tool magazine 40 can be retrieved from its rear end position by the coordinate guide 8.

A number of embodiments of the invention have been described. Nevertheless, it will be understood that various modifications may be made without departing from the spirit and scope of the invention. Accordingly, other embodiments are within the scope of the following claims.

What is claimed is:

1. A machine tool for processing workpieces, the machine tool comprising:
    a machine frame having a lower frame arm and an upper frame arm, wherein the lower frame arm and the upper frame arm extend in a longitudinal direction of the machine frame and are spaced apart in a vertical direction to define a frame compartment;
    a processing station supported by the machine frame and configured to interchangeably receive a processing tool for workpiece processing;
    a first tool magazine disposed at least partially within the frame compartment and defining multiple tool storage places configured to store respective processing tools that can be interchangeably received by the processing station, the first tool magazine and the processing station being movable relative to each other so as to replace a tool at the processing station with a selected processing tool stored in the first tool magazine;
    a second tool magazine defining multiple tool storage places configured to store respective processing tools remote from the processing station, the second tool magazine disposed farther than the first tool magazine from the processing station; and
    a tool transfer device having a tool holder configured to hold processing tools during tool transfer between the first and second tool magazines involving relative motion between the tool holder and at least one of the first and second tool magazines in the longitudinal direction of the machine frame;
    wherein the tool holder of the tool transfer device is mounted outside of the machine frame to a longitudinal side of the machine frame, and wherein the second tool magazine comprises a magazine platform that protrudes laterally in a horizontal direction with respect to the machine frame, on which magazine platform tool storage places defined by the second tool magazine are provided and above which magazine platform the tool holder of the tool transfer device is mounted such that the magazine platform is accessible from above by the tool holder of the tool transfer device.

2. The machine tool of claim 1, wherein the magazine platform is connected to the machine frame.

3. The machine tool of claim 1, wherein the first tool magazine comprises a horizontal tool carrier disposed at least partially within the frame compartment and extending transversely to the longitudinal direction of the machine frame, on which tool carrier the tool storage places defined by the first tool magazine are arranged adjacent each other transversely to the longitudinal direction of the machine frame.

4. The machine tool of claim 1, wherein the tool holder of the tool transfer device is movably guided on the machine frame in the longitudinal direction and is movable with a tool transfer movement into a receiving or transfer position at the second tool magazine and into a receiving or transfer position at the first tool magazine.

5. The machine tool of claim 1, wherein at least one of the first tool magazine and the magazine platform of the remote tool magazine is movable into a receiving or transfer position with a tool transfer movement in the longitudinal direction of the machine frame relative to the tool holder of the tool transfer device.

6. The machine tool of claim 5, wherein:
    the first tool magazine is movable relative to the tool holder of the tool transfer device in the longitudinal direction of the machine frame; and
    the magazine platform of the second tool magazine is movable by means of the first tool magazine, with the tool transfer movement, into the receiving or transfer position.

7. The machine tool of claim 6, wherein the magazine platform of the second tool magazine is detachably couplable to the first tool magazine for the tool transfer movement.

8. The machine tool of claim 7, wherein the magazine platform of the second tool magazine is positionable in a rest position away from the-receiving or transfer position while disengaged from the first tool magazine.

9. The machine tool of claim 1, wherein the tool holder comprises a plurality of independently actuatable tool holding elements spaced from each other in a direction of tool transfer movement.

10. The machine tool of claim 1, wherein the tool holder is adjustable in a horizontal direction perpendicular to the longitudinal direction of the machine frame with respect to the magazine platform of the second tool magazine.

11. The machine tool of claim 1, wherein the magazine platform of the second tool magazine is supported interchangeably on a supporting structure of the second tool magazine.

12. The machine tool of claim 1, wherein the machine tool for processing workpieces is for processing metal sheets.

13. The machine tool of claim 1, wherein the machine tool for processing workpieces is for processing plate workpieces.

* * * * *